(12) United States Patent
Chao et al.

(10) Patent No.: US 8,499,339 B2
(45) Date of Patent: Jul. 30, 2013

(54) AUTHENTICATING AND COMMUNICATING VERIFIABLE AUTHORIZATION BETWEEN DISPARATE NETWORK DOMAINS

(75) Inventors: Li-Lung Chao, Bedford, NY (US); Brian D. Goodman, New Haven, CT (US); James K. Kebinger, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 1158 days.

(21) Appl. No.: 11/840,684

(22) Filed: Aug. 17, 2007

(65) Prior Publication Data

US 2007/0289004 A1    Dec. 13, 2007

Related U.S. Application Data

(63) Continuation of application No. 10/229,693, filed on Aug. 28, 2002, now abandoned.

(51) Int. Cl.
*H04L 29/06* (2006.01)

(52) U.S. Cl.
USPC .................. 726/5; 726/4; 705/75; 705/77

(58) Field of Classification Search
USPC ............... 726/2, 4, 5, 10, 8; 705/75, 77, 78
See application file for complete search history.

(56) References Cited

U.S. PATENT DOCUMENTS

| | | | |
|---|---|---|---|
| 5,497,421 A | 3/1996 | Kaufman et al. | |
| 5,655,077 A | 8/1997 | Jones et al. | |
| 5,659,616 A | 8/1997 | Sudia | |
| 5,757,920 A | 5/1998 | Misra et al. | |
| 5,815,574 A | 9/1998 | Fortinsky | |
| 5,815,665 A | 9/1998 | Teper et al. | |
| 5,875,296 A | 2/1999 | Shi et al. | |
| 5,909,492 A | 6/1999 | Payne et al. | |
| 6,055,637 A | 4/2000 | Hudson et al. | |
| 6,092,196 A | 7/2000 | Reiche | |
| 6,128,738 A | 10/2000 | Doyle et al. | |
| 6,131,164 A | 10/2000 | Parker | |
| 6,226,752 B1 | 5/2001 | Gupta et al. | |
| 6,275,944 B1 | 8/2001 | Kao et al. | |
| 6,304,974 B1 | 10/2001 | Samar | |
| 6,725,376 B1 | 4/2004 | Sasmazel et al. | |
| 6,957,334 B1 | 10/2005 | Goldstein et al. | |
| 7,356,711 B1 * | 4/2008 | Calinov et al. | 713/180 |
| 2001/0000358 A1 * | 4/2001 | Isomichi et al. | 713/201 |

* cited by examiner

*Primary Examiner* — Gilberto Barron, Jr.
*Assistant Examiner* — Virginia T Ho
(74) *Attorney, Agent, or Firm* — Scully, Scott, Murphy & Presser PC; John E. Campbell (57) ABSTRACT

Verifiable authentication credentials are provided to foreign systems without passing an id and password to the protected resource. A user wishing to access a secure remote site is prompted for credentials, the credentials are authenticated locally and a digitally signed token is created. The token is redirected to the secure remote site by the user's browser using HTTP redirection. The digital signature is verified by the secure remote site preferably by a digital signature web service. The remote site establishes communications with the user if the digital signature is valid.

20 Claims, 10 Drawing Sheets

AUTHENTICATING AND COMMUNICATING VERIFIABLE AUTHORIZATION BETWEEN DISPARATE NETWORK DOMAINS

CROSS REFERENCE TO RELATED APPLICATIONS

The present application is a continuation application of application Ser. No. 10/229,693, filed Aug. 28, 2002.

FIELD OF THE INVENTION

The present invention is related to systems, program products and methods for secure computer data sharing, more particularly to authorizing communication with a secure entity in an Internet network.

BACKGROUND OF THE INVENTION

Figure 1:
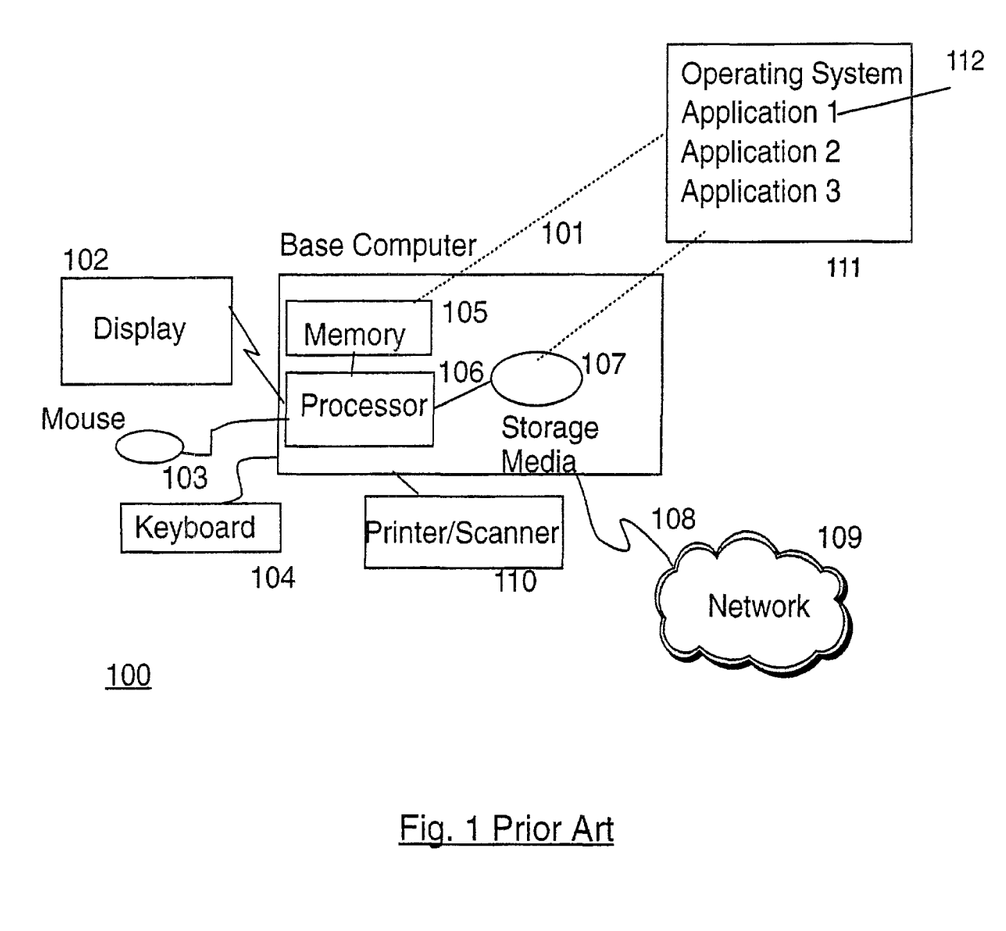
FIG. 1 is a diagram depicting example components of a computer system.

FIG. 1 depicts the elements that make up a typical computer for use in presenting and maintaing an application. The computer 100 consists of a Base Computer 101 which comprises a processor 106, storage media such as a magnetic disk 107 and a high speed volatile main memory 105. An operating system and application programs 111 reside on the storage media 107 and are paged into main memory 105 as needed for computations performed by the processor 106. The Base computer may include optional peripheral devices including a video display 102, a printer or scanner 110, a keyboard 104, a pointing device (mouse) 103 and a connection 108 to a network 109. In a client environment, a user will interact with a (Graphical User Interface) GUI by use of a keyboard 104 and mouse 103 in conjunction with the display of information on the display 102 under control of an application program (application 1) 112. The client application program 112 will then interact with remote users by way of the network 109.

Figure 2:
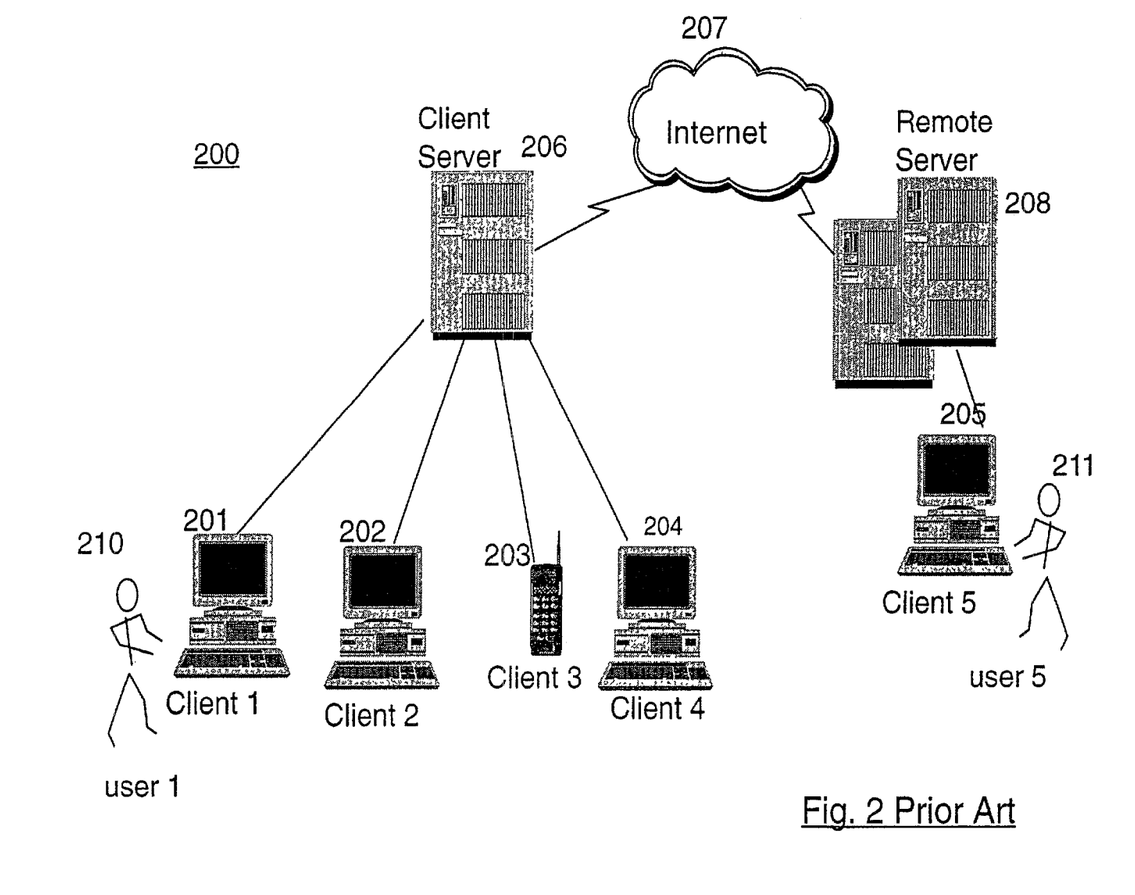
FIG. 2 is a diagram depicting example components of a client-server network.

In FIG. 2 an example Internet system is shown. A user 210 at client 1 201 uses applications on his system. This user (user 1 210) at client 1 201 can interact with clients 2-4 202-204 by way of a client server computer 206. Applications 112 may be provided by each client 201-205 and or the client server 206 or some remote server 208 by way of the network 207. The user at client 1 201 can interact with a remote user (user 5 211) at client 5 205 by way of the Internet 207.

One way that computers interact via networks such as the Internet is using the HyperText Transfer Protocol (HTTP) open standard designed by the World Wide Web Consortium (W3C) and standardized as Internet Engineering Task Force (IETF) RFC 2616. It is an intentionally simple and open protocol that is implemented across many heterogeneous computer systems.

An "HTTP Redirect" is a mechanism in which an HTTP Server can indicate to the user-agent that further action is needed to fulfill the request. A simple example is a resource moving to a different location. The original server can provide a pointer to the new location of the resource, and can further indicate that the pointer is intended to be permanent or temporary.

"Encoding" is the formatting of data according to a standard format. Base64 encoding (described in IETF RFC 1521) is a way of representing an arbitrary binary stream as the lower 65 characters in the ASCII alphabet. "URL Encoding" is a way in which strings meant to represent the arbitrary characters to which a given universal resource locator (URL) can be mapped within the bounds of the allowed url-safe subset of the ASCII alphabet.

"Encryption" is the act of encoding a file to prevent any person but the intended recipient(s) from reading it. "Hashing" is the act of applying a one way function to generate a fixed length value from an input of arbitrary size. The output of the hash function is useful for determining if content has been altered. "MD5" and "SHA" are some popular example hashing algorithms. :Signing" (also known as "digital signing") combines encryption with hashing to generate a representation of an object that can be proven to have been generated only by the sender. Digital Signature Standards (DSS) by Federal Information Processing Standards Publication 186 (May 19, 1994) and can be found at on the Internet.

"Extensible Markup Language" (XML) is an open standard from the W3C. XML is a standard way of presenting information such that the content describes itself. It is both human and machine readable. The format of a XML document can be specified externally, and document can be validated against these external specifications.

A "remote procedure call" is a way in which one computer can ask a second computer to perform an operation on some given input on its behalf and return the result. A World Wide Web (web) service is a remote procedure call that is encoded in XML and can be transported over HTTP as well as other mediums. Popular Web service protocols are SOAP and XML-RPC.

In the context of computer security, "authentication" and "authorization" are two different processes. Authentication is the process of establishing the identity of a client. Authorization is the process of taking the confirmed identity of a client and determining if that client is allowed to perform the requested actions.

User authentication and authorization are some of the fundamental security concerns of enterprise computing. Management of user access to resources within an enterprise becomes increasingly difficult as the number of resources grows particularly if the access of users must be managed at the individual resource. The user takes on an increasing burden if he/she must remember a long list of different user identity and password combinations in order to access a large number of resources. Significantly, the longer the list gets, the more chance there is that the user will begin to insecurely store such passwords and inadvertently cause a security breach.

Centralizing the administration of user id and passwords provides an enormous benefit to an enterprise of even a small size. For example when an employee separates from the enterprise, the access formerly granted to that user can be centrally and instantly revoked. A given user can use the same id and password to login at every site that chooses to allow him or her access. In a system like this, when the user attempts to use a given resource, the user is prompted for a user id and password, which is forwarded by the resource to a central user id and password repository which will confirm the validity of the entered user identity and password combination. LDAP and Microsoft Windows networking are examples of such systems.

Having a central ID and password store is a big leap, but there is still a vulnerability in the system. Computers on the network are trusted with the handling of sensitive passwords. A rogue computer could be configured to log or otherwise improperly disseminate the passwords of each user that logs in to that system. Another solution is to have a trusted central authority that will be the only system to handle password related information. The trusted system then needs a way to notify the individual resources of the confirmed identity of a given resource. Microsoft Passport and DCE/kerberos-like systems are examples of this kind of central authentication systems.

The prior descriptions of the various enterprise security schemes are simplified to only encompass authentication. Security systems typically retrieve authorization information along with the authentication information.

SUMMARY OF THE INVENTION

The present invention (IIPX) teaches a system for authenticating a user without passing an id and password to the protected server. A client browser presents an authentication prompt to the user. The user provides their credentials. The server processes the authentication request resulting in a digitally signed token. The token is then sent to the target server. The target server receives the token and requests signature verification from the originating client.

It is therefore an object of the present invention to provide user access to a remote secure server wherein a user's credentials are checked at a first server and a digitally signed token is sent to the remote secure server, the remote secure server decodes the digitally signed token to confirm authenticity.

It is a further object of the present invention to provide a method for transmitting an authenticated verifiable identity token, transparently to the user, via HTTP 301 URL redirection.

It is another objective of this present invention to provide a means to communicate across disparate networks using HTTP 301 URL redirection.

It is a further objective of the present invention to provide a method for using digital signatures to maintain URL integrity in a networked environment.

It is still a further objective of the present invention to provide a method for generating and mapping authentication challenges via unique "resource identifying" codes.

It is still a further objective of the present invention to provide a means of expiring digitally signed tokens (XML/Document/Messages).

The above as well as additional objectives, features, and advantages of the present invention will become apparent in the following written description.

DESCRIPTION OF THE PREFERRED EMBODIMENTS

The present invention provides a method for securely accessing a secure remote server (preferably a web server) without passing authentication credentials to the remote server. The example system employing the present invention is herein called "IIPX" or IBM Intranet Password External.

In the preferred embodiment (referring to FIG. 3), IIPX comprises an LDAP directory 303, authentication/redirection application 302, a client web browser 301, a disparate web site 304 and a digital signature verification service 305.

Figure 3:
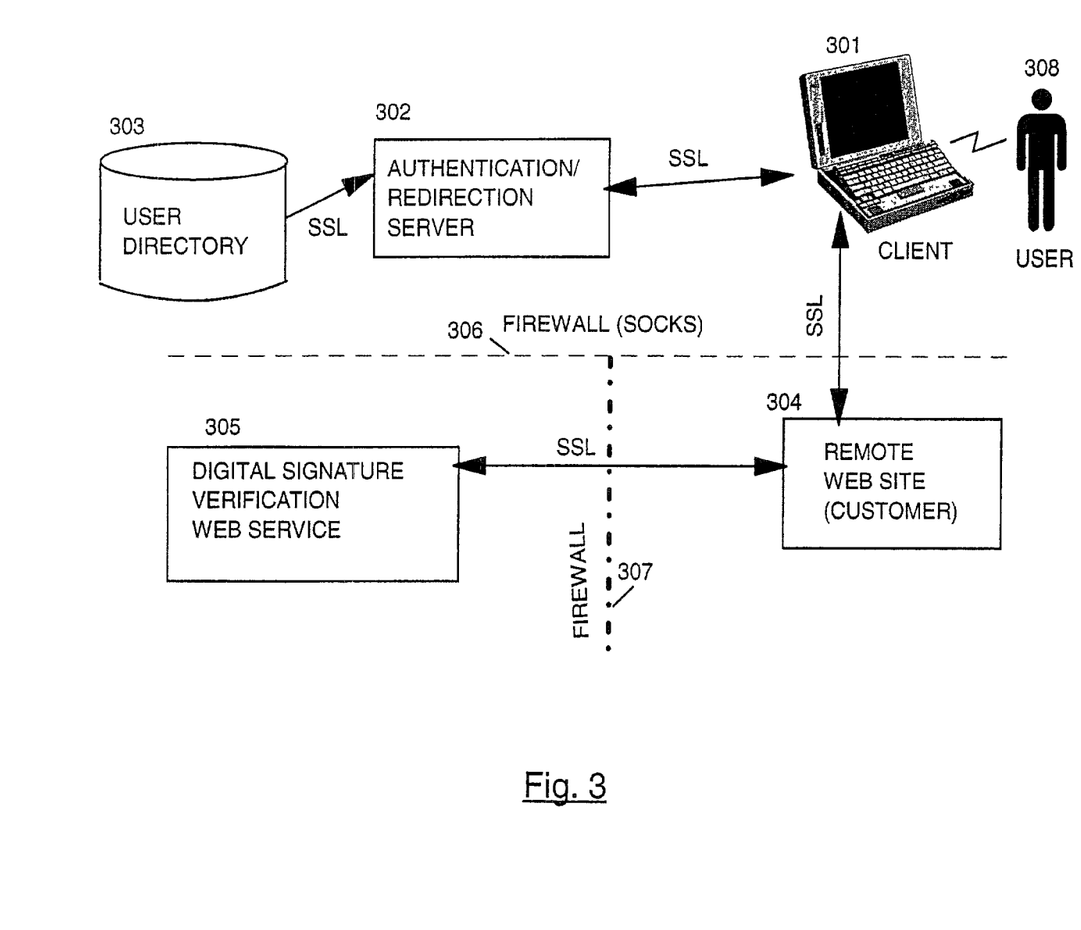
FIG. 3 is a diagram depicting example components of the invention.

The LDAP directory 303 provides a means for storing information pertaining to entities in an organization. It is a digital network name and address book. The LDAP directory 303 provides:

1. Ability to store, retrieve, edit, organize entity information in an efficient manner; and
2. Ability to provide a central store of authentication, such as, user id/password or digital certificates.

The authentication/redirection application 302 is comprised of a web application (dynamic HTML). The authentication/redirection application runs on a computer system similar to the one shown in FIG. 1 wherein an application resides in storage 105 to be executed in processor 106. The application provides:

1. Authentication checks to the LDAP directory;
2. XML document creation; and
3. Digital signing and dynamic URL redirection.

The client web browser 301, also running in a user's computer as taught in FIG. 1, is an application for viewing web technologies, such as HTML, DHTML, JavaScript, VBScript and Java Applets. The client web browser also provides the ability to submit content to remote servers by way of a network (preferably the Internet 207). The client browser application 301 provides:

1. Submitting authentication credentials;
2. Connecting to servers securely using SSL; and
3. Following redirection prompts as provided by web servers.

The disparate web site 304 is any web site that requires authentication but does not have access the user's authentication server. The disparate web site 304 is a set of applications running on a computer similar to the one shown in FIG. 1 and provides:

1. Protected content or services;
2. Receives signed token from authentication/redirection application; and
3. Makes necessary calls to the digital signature validation service to verify tokens.

In the preferred embodiment the signature validation service 305 is part of the originating entity providing a secure interface for remote systems to request token verification. A secured connection preferably uses SSL encryption to establish trusted connections between two machines.

In a preferred embodiment, a web browser client 301 communicates to the authentication/redirection Server 302 via a secure URL specifying a desired vendor. A secured web site uses SSL encryption to establish trusted connections between two machines. Most web browsers provide this technology transparently to the end user 308. Often a pad-lock icon FIG. 10 1005 indicates when the HTTP communication is secured.

The data store 303, such as a database, flat file or memory is maintained with vendor ids and the specific requirements of the vendor (remote secure server) login. In this case the vendor ID indicates which HTML form to present to the user 308 via the browser 301. In one embodiment, each remote secure website 304 has a unique HTML prompt form which is dynamically presented to the user 308 when he selects a remote secure service 304. In another embodiment, the vendor ID prompts an HTTP 401 challenge (see FIG. 4). The data can be entered in many different ways, however, a web based interface is preferred. This interface provides an HTML form to allow for the creation and association of the vendor code and authentication method.

Based on the vendor ID, the authentication/redirection server 302 supplies an HTML web page to prompt the client 301 for login information. In a preferred embodiment, this authentication prompt is customized based on the vendor ID.

The user 308 of the web browser 301 enters their authentication credentials. The user 301 (or optionally the user's organization) in one embodiment, also provides other information to be incorporated into the authentication token. Upon receiving the login request, the authentication/redirection server 302 checker checks the credentials. If the credentials are OK, an authorizer authorizes user access, the authentication redirection server 302 then generates an XML based token (reference example Table 1) which may include personal information such as first name, last name, address or employee number.

TABLE 1

Sample XML token.

<SignonRequest vendor="ABC123">
    <Name>
        <LastName>Smith</LastName>
        <FirstName>John Q.</FirstName>
    </Name>
    <EmployeeID>
        <CountryCode>us</CountryCode>
        <SerialNumber>123456</SerialNumber>
    </EmployeeID>
    <EmailAddress>chao@us.ibm.com</EmailAddress>
    <TimeStamp>2002.07.17 15:38:46 GMT</TimeStamp>
    <Expiration>2002.09.11 15:38:46 GMT</Expiration>
</SignonRequest>

The XML token optionally includes a time-to-live field representing the time during which the token is valid. The authentication/authorization application 302 then uses a signature generator to digitally signs the XML token. The token, reference example token in Table 1, is BASE64 encoded and URL encoded. The result is shown in Table 2. The server then redirects the client web browser transmitter to transmit the resulting request to the remote vendor's server 304 using HTTP URL redirection. The vendor's server 304 receives the token and digital signature as CGI variables. CGI variables are a means for passing name and value pairs to applications runnina in a web server. The vendor application communicates to a verification service 305 to check the token validity. The verification service 305 checks the originating digital signature against the signature and XML token provided by the remote server 304. It 305 further checks that the token has not been checked before and that the token has not timed out. The verification services 305 returns an indication of the token's validity "YES/NO/ERROR" to the remote vendor server 304.

TABLE 2

Sample HTTP 301 for user "John Q. Smith"

http://ww.remote-server.com/remote-login?SiteID=IBM& msg=
PFNpZ25vblJlcXVlc3QgdmVuZG9yPSJBQkMxMjMiPjxOYW1lPjxMYXN0TmFtZT5z
ZWFnZXI8L0xh%0D%0Ac3ROYW1lPjxGaXJzdE5hbWU%2BS3Jpc3RlbjwvRmlyc3RO
YW1lPjwvTmFtZT48RW1wbG95ZWVJRD48%0D%0AQ291bnRyeUNvZGU%2BdXM8L0Nv
dW50cnlDb2RlPjxTZXJpYWxOdW1iZXI%2BQzAwMzk3MzwvU2VyaWFs%0D%0ATnVt
YmVyPjwvRW1wbG95ZWVJRD48RW1haWxBZGRyZXNzPmtyaXN0ZW4ueWVhZ2VyQGdh
bGlsZW8u%0D%0AY29tPC9FbWFpbEFkZHJlc3M%2BPFRpbWVTdGFtcD4yMDAyLjA1
LjE3IDEzOjA5OjU1IEdNVDwvVGlt%0D%0AZVN0YW1wPjxFeHBpcmF0aW9uPjIwMD
IuMDUuMzEgMTM6MDk6NTUgR01UPC9FeHBpcmF0aW9uPjwv%0D%0AU2lnbm9uUmVx
dWVzdD4%3D&
sig=
ANTy5kFaTOO73uAF9LD%2FvKHl3mWbgtiTMWDu%2B7mGLcbEXhNlyT%2F9zsRHZ2
mz5ANAtsXcE9Ov0FHL%0D%0A%2B1JlaNwTQyIIILdefVmifYsQCEnaRnncZCBPt6
lF0ieh%2FnNqEiQoC7YDniGzrMQ4L%2FEj3j6SQNr9%0D%0AXQyGNvnCq%2FoHpR
hNouk%3D In a preferred embodiment, digital signatures and XML tokens would be represented using Base-64 and URL encoding as exemplified in table 2.

In the example that follows, James is trying to access a travel web site from within his company's intranet. James 308 begins his web travels using his HTML browser 301. The starting URL is hosted on the corporate secure web site 304.

Figure 6:
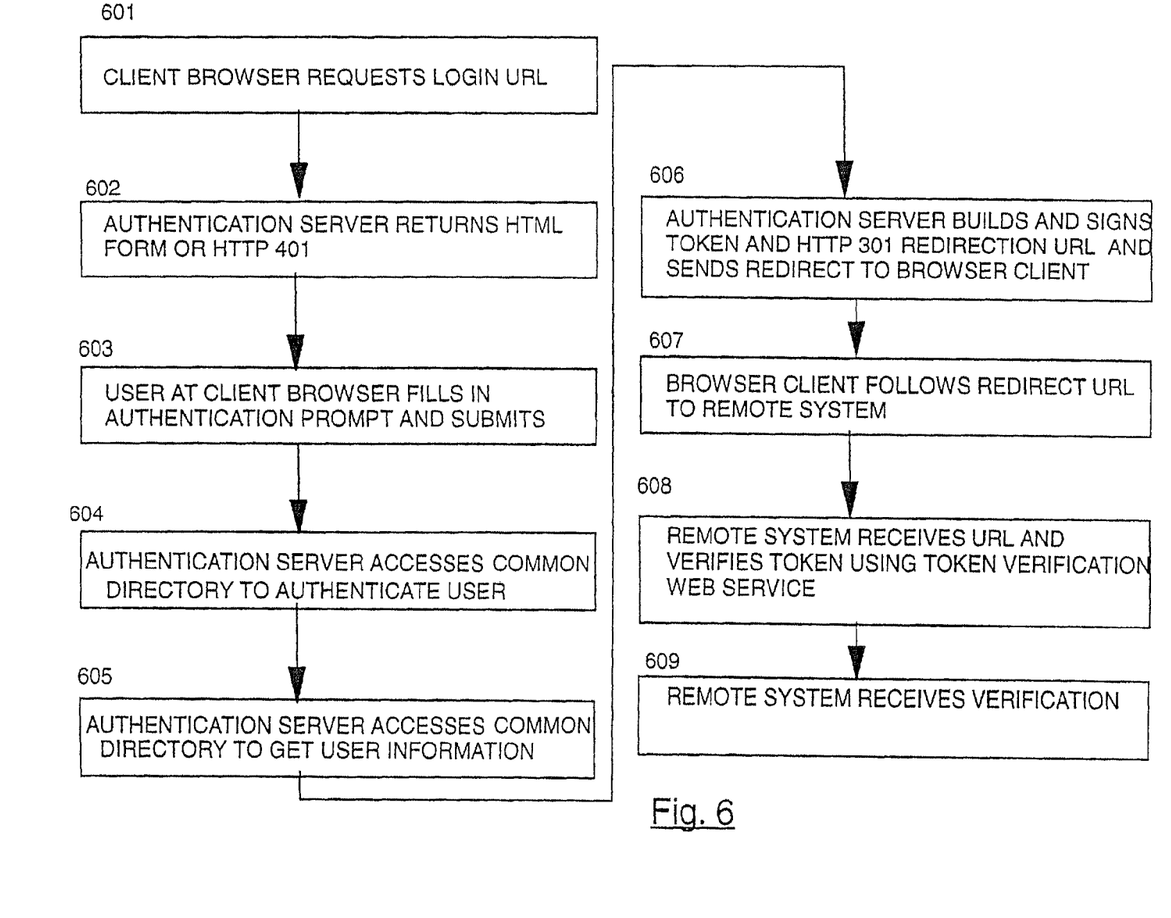
FIG. 6 is a flow diagram representing major events of the present invention.
Figure 10:
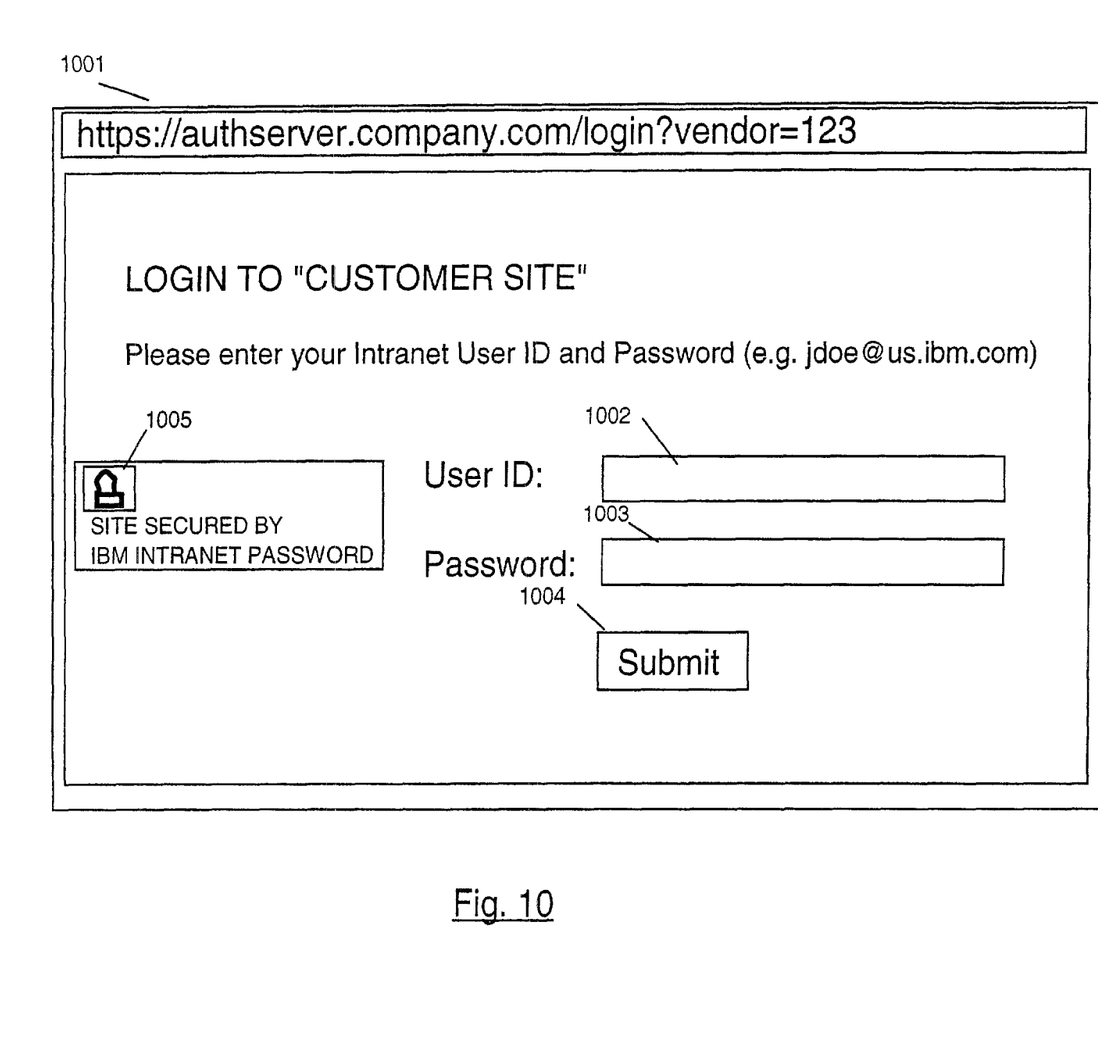
FIG. 10 is a representation of a login display for accessing a remote secure server.

Referring to FIG. 6, James' browser 301 requests a login web page FIG. 10 for the secure site. At 601, login request is directed to the authentication server 302 which preferably dynamically builds an HTML form, customized for the requested site. At 602, authentication server returns the HTML form to James' browser. The web page begins with some information about the external vendor web site, but also prompts him for his username and password. The login form is customized to the style of the external travel web site. This customization was determined by the vendor code maintained by James' company. It provides the unique design of the travel web site while clearly indicating that James can use his intranet password to login. James will use his common authentication password stored in the corporate LDAP directory.

At 603, James enters his ID 1002 and Password 1003 and hits the "Submit" button 1004. When James presses the submit button on the HTML form, his user name and password are sent at 604 to the authentication/authorization 302 to verify his credentials.

Figure 7:
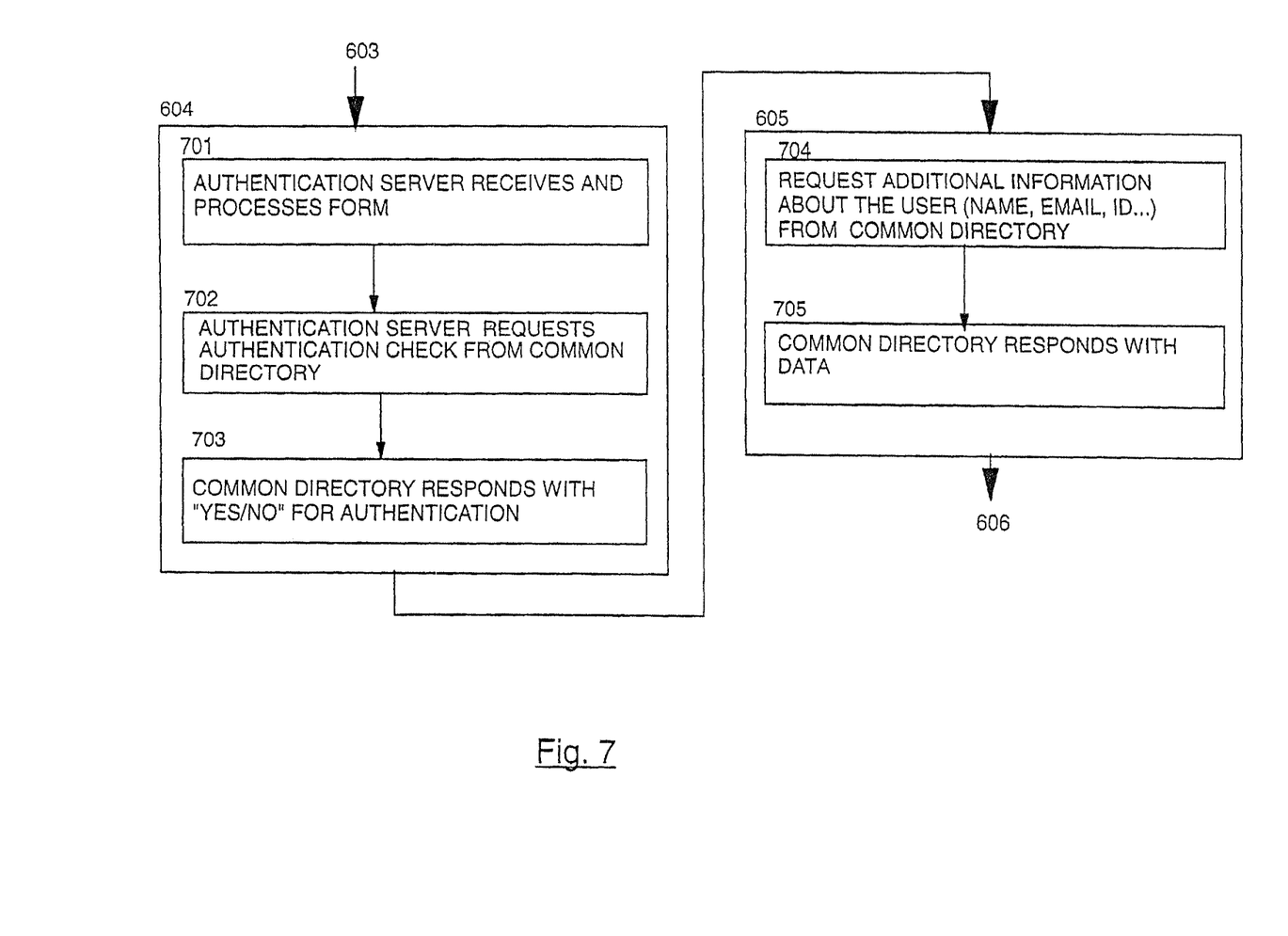
FIG. 7 is a flow diagram representing credential authentication.

When the authentication server 302 receives his credentials at FIG. 7701, the authentication server 302 makes a connection to the corporate LDAP directory at 702. The corporate LDAP directory is like a phone book. It stores information about individuals in a organization. Two of the fields it stores is a user's user name and password. The web server requests verification that James has entered the appropriate user name and password for his LDAP entry. If there is an error, James is prompted as such. In this case James has provided the correct credentials and the LDAP check is successful at 703.

Figure 8:
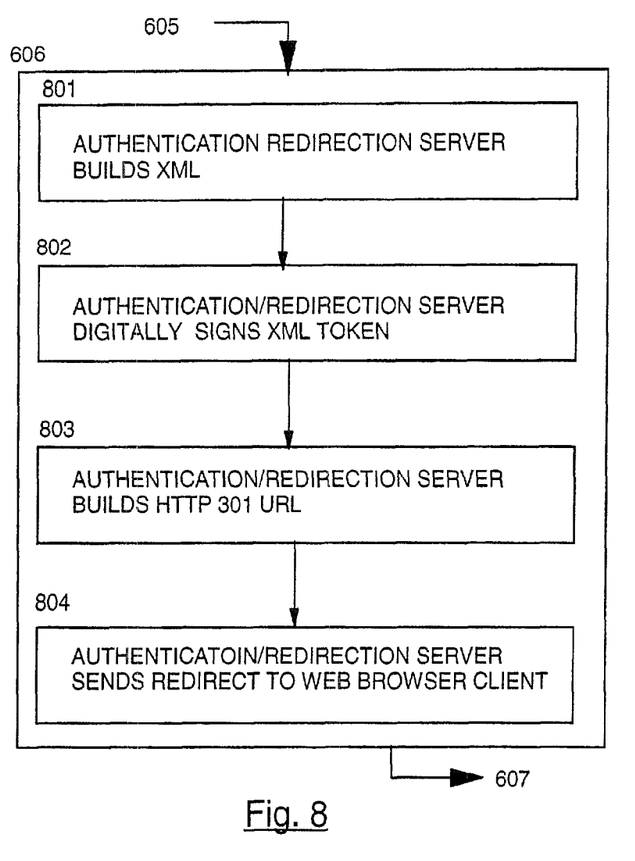
FIG. 8 is a flow diagram representing digital signature creation.

As with many useful web sites, the external travel web site 304 needs personal information about James. In the case of his company, they have opted to provide that on James' behalf at 605. The web server queries the LDAP server 704 for James' first name, last name, employee ID and e-mail address. Referring to FIG. 8, 606 the web server builds an XML document at 801 containing this personal information. It adds three more parts, the vendor's ID, a time stamp as to when the packet was created and an expiration time. The expiration time will indicate as to when this XML document is to be treated as invalid.

Having created the XML document the web server digitally signs the XML packet at 802. This process is done through technology, applications and code well known in the art.

At 803, the web server now builds the HTTP 301 URL redirect with the digital signature and XML packet. The XML packet is BASE64 encoded and URL encoded to preserve the content while making it URL compliant (Table 2). The web server sends the redirection URL back to James' HTTP browser at 804.

Most common browsers automatically follow URL redirect from web servers 607. Other browsers simply state that the resource requested has moved please look to the following URL to find it. In this case, James' web browser receives the URL redirect and automatically follows the new URL 607. Because James has configured his browser correctly, the URL redirection seamlessly points him at the external travel web site 304.

Figure 9:
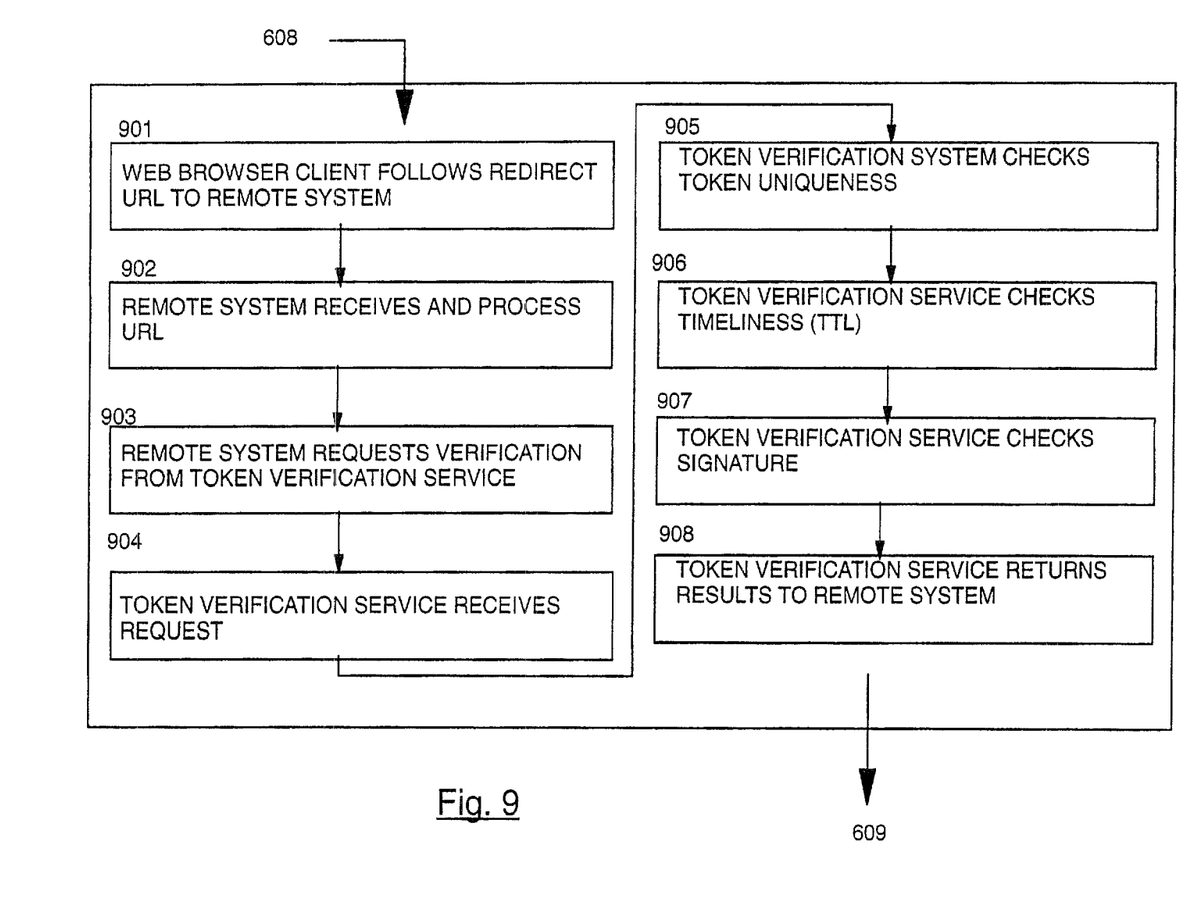
FIG. 9 is a flow diagram representing verification of the digitally signed token.

The external travel web site 304 has a special URL for employees from James' company. Referring to FIG. 9, at 901 the redirection URL points there. At 902, the travel web site receives James' HTTP request. Name and value pairs are passed via the URL format. As seen in Table 2, the web server is able to identify the digital signature and the XML token. The travel web site now has these two parts but still needs to validate the token.

The travel web server first BASE64 decodes the XML packet (Table 2) and looks at the vendor ID to make sure it was intended for them. The travel web server optionally checks to see if the XML packet has already expired via the expiration time stamp. If the packet is still viable then the web site makes a connection back to James' company.

James' company runs a signature verification service 305. In another embodiment, the validation service is provided by any trusted party. The service validates digital signatures for data that has been previously signed. In this scenario it will be validating digital signatures of XML documents. At 903, the travel web site makes a request for validation.

At 904, the verification service receives the request form the travel web site. The request contains the digital signature and the XML document. The verification service checks to see that the XML document has not expired at 906. If it has, it returns that result to the travel web site. Otherwise, the verification service keeps a record of each XML token it receives in storage, such as memory, database or hard disk. It removes them from storage after the XML token's expiration time has been reached. By storing previous tokens for a period of time, at 905 the verification system can determine if a requested token has already been processed. One of the ways to further secure the system, the time to store each token is determined based on the expiration of each token. Retaining the token until expiration renders the XML document useless in future requests.

Assuming the XML token is still timely it signs the XML document. At 907, the verification service then compares the signature it created with the signature that the travel web site presented as part of the verification request. If they do not match the result is returned to the travel web site. If they match then a positive result is returned at 908 to the travel web site.

As shown at 609, the external travel web site receives the results from the verification service. If the results are negative then it presents an HTML page to James' HTTP browser to alert him of the condition. If the result is positive the travel web site uses the personal data in the XML token to provide a customized web page to be sent back to James' HTTP browser 301. While there are many steps to this process, James experienced a quick and seamless end-to-end response. As far as James was concerned he logged in from inside his company and was transparently transported to an external web site that had personal information about James for an enhanced user experience.

All the network connections in the preferred embodiment use SSL to encrypt transactions. While the external web site verifies authentication and authorization via the digital signature service, it is possible for network communications to be compromised. One way would be to capture the redirect URL and attempt to use it to replay the series of events. If no extra security precautions were taken it would be feasible for an eavesdropper to obtain a URL that was not theirs and therein access web sites as someone else.

Referring to FIG. 3, Firewalls 306, 307 act as barriers on a network. They often delineate the internal "Intranet" and the external "Internet". They are often used to keep bad traffic out. Bad traffic is considered unsolicited network connections. However, firewalls 306, 307 also keep network traffic in. Intranets often can access the Internet, but the Internet is usually prevented from accessing the Intranet. Usually these unwanted communications are perpetrated by hackers. Firewalls 306, 307 also regulate what kind of network activity can leave the network. Firewalls 306, 307 provide the management at the network layer defining and enforcing which types of connections are to be permitted. In the preferred embodiment the connection traverses the firewall using HTTP URL redirection. HTTP/HTTPS is a common protocol allowed through most firewalls. URL redirection is a preferred method for indirectly traversing disparate networks.

Figure 4:
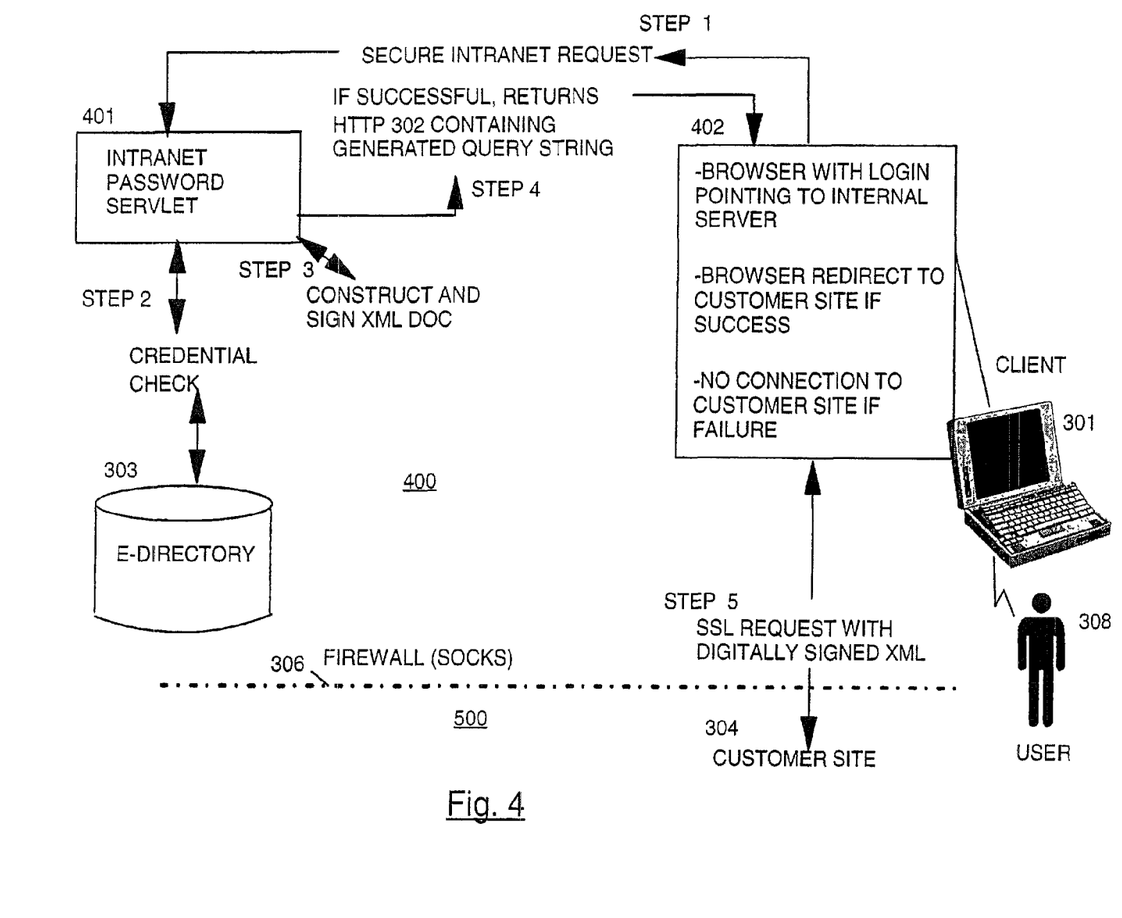
FIG. 4 depicts an example flow diagram depicting creating a digitally signed token according to the present invention.

To review the preferred embodiment functionality, refer to FIG. 4. The user 308 views an HTML page on his browser running on his client machine 301. When the user 308 wishes to go to the secure remote site (customer site) 304, he is presented with an HTML page FIG. 10 1000 prompting him for his Password and ID (his credentials). The browser is pointing to an internal server 402, which is preferably the authentication/redirection server 302. The user enters the information and submits the request as shown in step 1. The authentication server 302 running an intranet password servlet 401 user checker, checks the user's credentials (step 2) against the LDAP directory 303 (the authenticator program retrieves LDAP user credentials). The authentication server 302 creates an XML document (a token generator generates a token message) and digitally signs it (step 3). The authentication server 302 then (step 4) uses a redirection creator to create an "HTTP 302" redirection message and by way of a redirect communicator routine, returns the "HTTP 302" containing generated redirect URL query strings to the browser 301. The browser is redirected at 402 to the customer site 304. In step 5 the signed XML is sent to the customer site 304 over secure socket layer.

Figure 5:
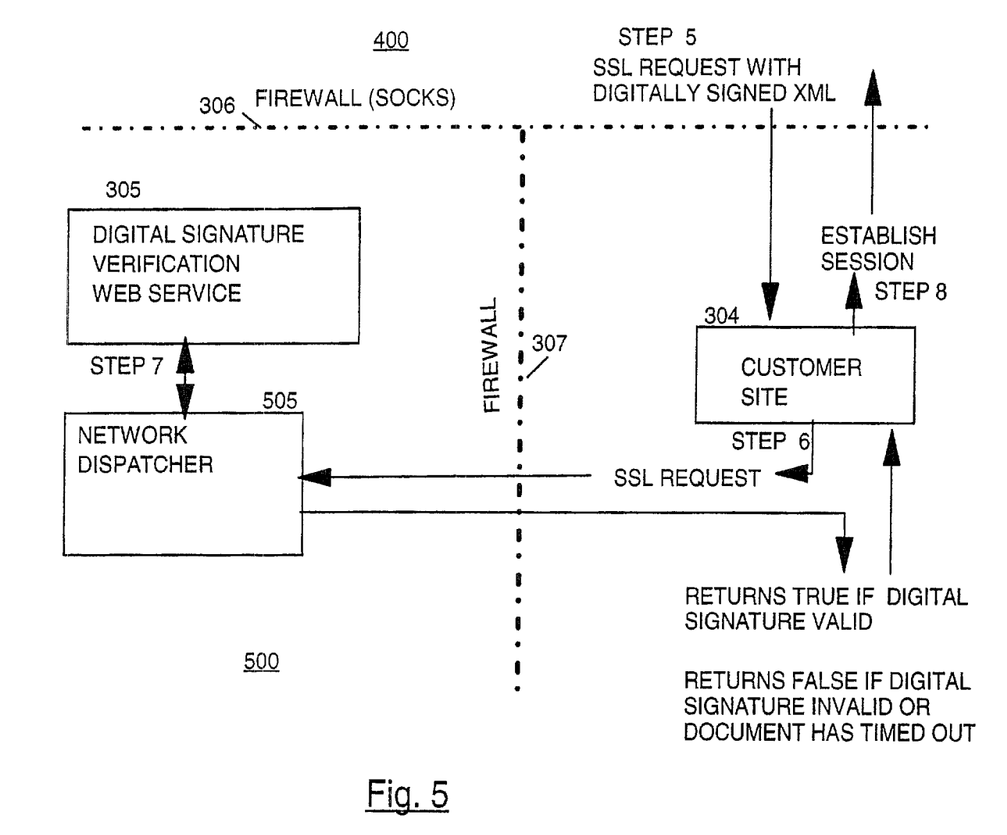
FIG. 5 is an example flow diagram depicting verifying the digitally signed token at a secure server.

Referring to FIG. 5, a secure remote server "customer site" 304 receiver receives the signed request token and the secure site server's signature sender sends an SSL request (step 6) comprising the signed token via network dispatcher 505 to a digital signature verification web service 305. The web service signature validity receiver receives the token and the digital signature verifier verifies the token (step 7) and returns an indicator of the validity (True/False/Error) to the Secure customer site. The Secure site 304 session establisher establishes a session with the user (step 8) if the token verification was successful.

While the preferred embodiment has been described comprising a corporate business site servicing many users, it should be apparent to one skilled in the art that other variations exist. For instance, an another embodiment, the digital signature verification service 305 is a separate entity from the authentication/redirection server 302. In such an environment, groups or individuals acquire digital signature components that are instantiated in the separate digital signature verification service 305. For example, a user wishing to have access to a remote web site 304 opens a security generating web page. The web page comprises HTML code for communicating with the Digital Signature Verification service 305, supplying identifying information and optionally paying fees. The Verification service 305 provides a private key to the user which is used by the user's authentication redirection server to generate a digital signature for the user's token. The digital verification service 305 associates the user's token with a unique private key for digital signature generation and verification.

In another embodiment, the digital signature verification service 305 supports multiple private keys, one or more private keys are associated (preferably by table lookup) with individual remote web sites 304. In another embodiment, multiple private keys are associated with more granular elements such as user ID, subgroup ID (Corporate Department), Project ID (associating a private key with an ID shared by users having similar authority) and the like.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for a user to access a secure Internet site of a specified vendor, utilizing user credential data and other user data and without passing a user ID and password to the secure Internet site, the method comprising the steps of:

receiving a request from a user computer system via an intranet, to an authentication server for access to a secure Internet site for a specified transaction with a specified vendor;

maintaining in a database, an ID for the specified vendor and specific requirements of the specified vendor;

the authentication server creating a web page for the specified vendor using said specific requirements, and sending said web page to the user computer system;

receiving, by the authentication server, from said user computer system via the intranet, said web page, said web page comprising user provided user credential data;

the authentication server checking the user credential data of the user including a user ID and password according to a first predetermined plan to determine that the user is permitted access to said secure Internet site;

said authentication server authorizing said user to access the secure Internet site to transmit the specified transaction threat based on said user credential data permitting said access;

said authentication server creating a digitally signed request comprising said other user data for said authorized user according to a second predetermined plan;

transmitting said digitally signed request over the intranet from the authentication server to the user computer system, for forwarding, by said user computer system, to a vendor server at said secure internet site, said digitally signed request over the Internet;

verifying the validity of said digitally signed request including receiving said digitally signed request from the vendor server at the secure Internet site, at a third, verification service, separate from the vendor server;

said verification service determining whether said digitally signed request is valid and thereby determining whether said specified transaction is authorized; and based on said digitally signed request being valid, the verification service informing the vendor server that the user is authorized for the specified transaction, and the authorized user obtains access to the secure Internet site for the authorized specified transaction without passing the user credential data to the secure Internet site and without giving the secure Internet site access to the authentication server.

2. The method according to claim 1 wherein said Internet site comprises world wide web pages.

3. A method according to claim 1, further comprising the step of:

said vendor server establishing a communication session with said user computer system based on said digitally signed request being valid.

4. The method according to claim 3 wherein a given digital signature is used to create said digitally signed request, and said verifying step comprises the further steps of:

sending said digital signature to the verification service at a verification Internet site; and the vendor server receiving an indication of the validity of said digital signature from said verification Internet site.

5. The method according to claim 1 wherein said checking user credential data step further comprises the steps of:

checking said user credential data against data in a common directory;

creating a token message;

creating a redirect URL to the secure Internet site; and communicating the redirect URL to a user browser.

6. The method according to claim 5 wherein said token message comprises any one of XML data, an expiration field or unique user information.

7. The method according to claim 5 wherein said redirect URL is digitally signed.

8. A system for a user to access a secure Internet site, the system utilizing user credential data and other user data, the system comprising:

an authentication server for receiving from a user at a user computer system, via an intranet, a request for access to a secure Internet site for a specified transaction with a specified vendor;

a database holding an ID for the specified vendor and specific requirements of the specified vendor;

said authentication server creating a web page for the vendor using said specific requirements, and sending said web page to the user computer system; wherein user credential data is added to said web page and said web page is sent, with said user credential data, to the authentication server via said intranet;

the authentication server checking the user credential data according to a first predetermined plan, and authorizing said user to access the secure Internet site to transact a specified transaction thereat based on said user credentials permitting said access;

said authentication server creating a digitally signed request comprising said other user data for said authorized user according to a second predetermined plan;

transmitting said digitally signed request over the intranet from the authentication server to the user computer system for forwarding, by said user computer system, to a vendor server at said secure internet site, said digitally signed request over the Internet;

a verification service, separate from the vendor server, receiving the digitally signed request from the vendor server at the secure Internet site to determine whether said digitally signed request is valid and thereby to determine whether said specified transaction is authorized; and wherein:

based on said digitally signed request being valid, the verification service informs the vendor server that the user is authorized for the specified transaction, and the authorized user obtains access to the secure Internet site for the authorized specified transaction without passing the user credential data to the secure Internet site and without giving the secure Internet site access to the authentication server.

9. The system according to claim 8 wherein said Internet site comprises world wide web pages.

10. The system according to claim 8, wherein:
the vendor server establishes a communication session with said user computer system based on said digitally signed request being valid.

11. The system according to claim 10 wherein a given digital signature is used to create the digitally signed request, and wherein:
the vendor server sends said digital signature to the verification service at a verification Internet site; and
the vendor server receives an indication of the validity of said digital signature from said verification Internet site.

12. The system according to claim 8 wherein said authentication server comprises:
a user checker checking said user credentials against data in a common directory;
a token generator creating a token message;
a redirection creator creating a redirect URL to the secure Internet site; and
a redirect communicator communicating the redirect URL to a user browser.

13. The system according to claim 12 wherein said token message comprises any one of XML data, an expiration field or unique user information.

14. The system according to claim 12 wherein said redirect URL is digitally signed.

15. A computer program product for a user to access a secure Internet site, the computer program product utilizing user credential data and other user data, the computer program product comprising a tangible computer readable device having computer readable program code tangibly embodied therein, the computer program product comprising:
computer readable program code for using an authentication server for receiving from a user computer system, a request from a user, via an intranet, for access to a secure Internet site for a specified transaction with a specified vendor;

computer readable program code for using the authentication server for creating a web page for the specified vendor using specific requirements of said specified vendor, and sending said web page to the user computer system;

computer readable program code for receiving, by the authentication server, from said user computer system via the intranet, said web page, said web page comprising user provided user credential data;

computer readable program code for using the authentication server for authorizing said user to access the secure Internet site to transact the specified transaction thereat based on said user credentials permitting said access;

computer readable program code for using the authentication server for creating a digitally signed request comprising said other user data for said authorized user according to a second predetermined plan;

computer readable program code for transmitting said digitally signed request over the intranet from the authentication server to the user computer system, for forwarding, by said user computer system, to a vendor server at said secure internet site, said digitally signed request over the Internet;

computer readable program code for receiving said request from the vendor server at the secure Internet site, at a verification service separate from the vendor server, to determine whether said digitally signed request is valid and thereby to determine whether said specified transaction is authorized; and computer readable program code for informing the vendor server, based on said digitally signed request being valid, that the user is authorized for the specified transaction, and the authorized user obtains access to the secure Internet site for the authorized specified transaction without passing the user credential data to the secure Internet site and without giving the secure Internet site access to the authentication server.

16. The computer program product according to claim 15 wherein said Internet site comprises world wide web pages.

17. A computer program product according to claim 15, further comprising:
computer readable program code for establishing a communication session between the vendor server and said user computer system based on said digitally signed request being valid.

18. The computer program product according to claim 17 wherein a given digital signature is used to create the digitally signed request, and the computer program product further comprises:
computer readable program code for sending said digital signature to the verification service at a verification Internet site; and
computer readable program code for enabling the vendor server to receive an indication of the validity of said digital signature from said verification Internet site.

19. The computer program product according to claim 15, further comprising:
computer readable program code for checking said user credentials against data in a common directory;
computer readable program code for creating a token message;
computer readable program code for creating a redirect URL to the secure Internet site; and computer readable program code for communicating the redirect URL to a user browser.

20. The computer program product according to claim 19 wherein said redirect URL is digitally signed.

* * * * *